Patented May 8, 1934

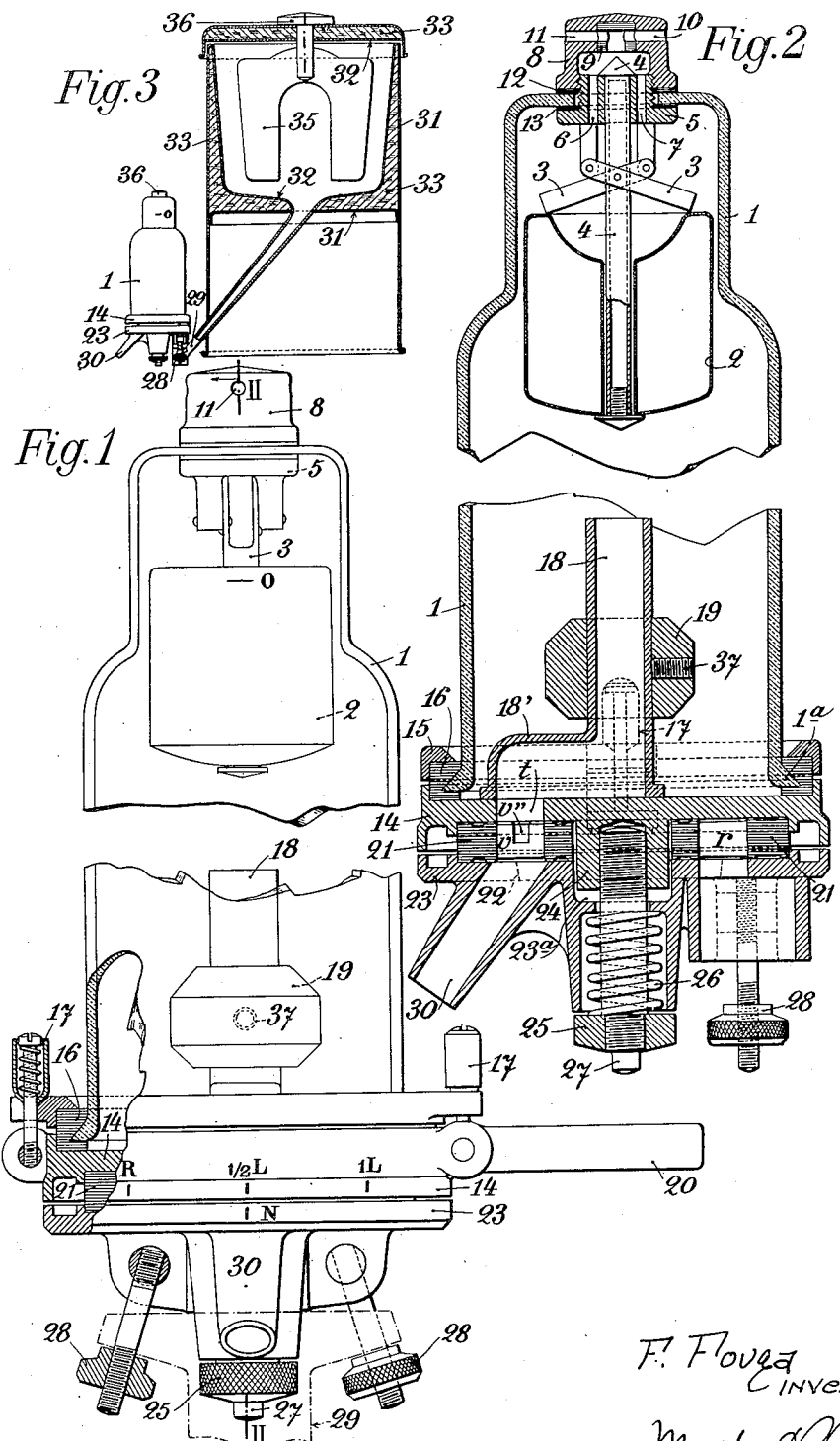

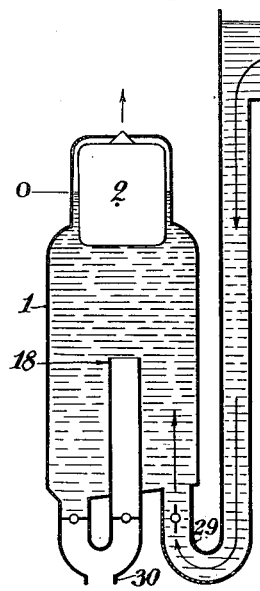
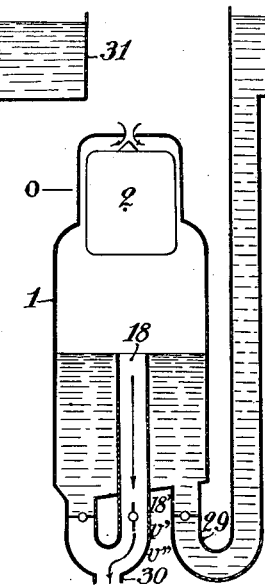
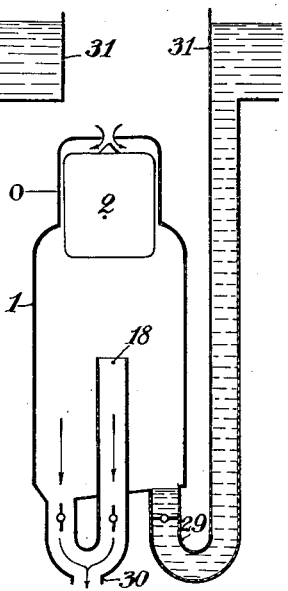
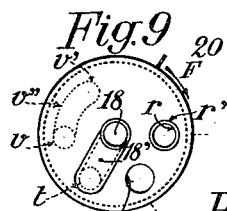
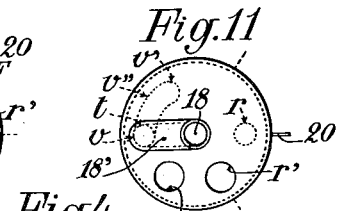
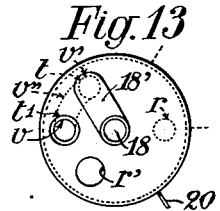
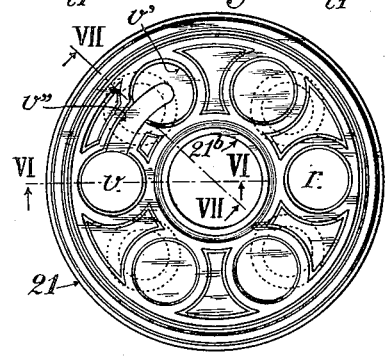
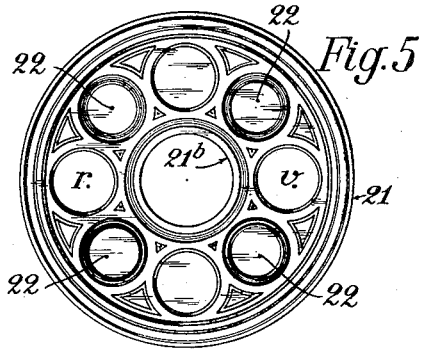
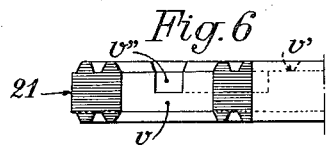
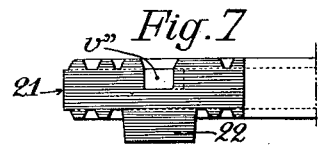

1,957,881

UNITED STATES PATENT OFFICE 1,957,881

MEASURING AND DISTRIBUTING APPARATUS FOR ALIMENTARY LIQUIDS OR OTHERS, AND MORE PARTICULARLY FOR MILK

François Fouga, Paris, France

Application May 29, 1933, Serial No. 673,549
In France May 30, 1932

2 Claims. (Cl. 221—95)

This invention has for its object a measuring and issuing apparatus for liquids of any kind and particularly for milk, which is designed to operate in the best conditions of convenience, accuracy and hygiene, to be simple and sturdy in construction and to avoid any possibility of fraud in the measurement of the quantities issued.

The apparatus according to the invention comprises a glass measuring container having an exactly gauged capacity and arranged to be fed by gravity from a tank.

The said container is provided at its upper portion with an automatic float device which allows the air to escape through suitably arranged orifices during the filling, which closes the said orifices and cuts off the liquid supply automatically in the moment when the liquid has reached a definite level and which finally allows the air to reflow into the measuring container as the liquid is issued.

Moreover, the bottom of the said measuring container is provided with a pivoting valve member comprising suitably arranged ports and cooperating with supply and delivery conduits, the whole being arranged so that the said valve member can be set e. g. in three different positions, viz.: a "filling" position in which the tank communicates with the measuring container, another position in which the said measuring container will empty completely, thus providing an issue of liquid amounting e. g. to one litre where such is the container capacity, and finally another position in which the issue of only a fraction of such capacity—e. g. half a litre—will be effected.

Such issue of only a fraction of the measuring container capacity is obtained by setting the delivery conduit into communication with a conduit located within the measuring container and the upper orifice of which is positioned at a definite level, whereby all the liquid below the said level will remain undelivered in the measuring container.

Other peculiarities of this apparatus will appear from the disclosure of a preferred embodiment thereof which is described hereinafter by way of example only, reference being had to the appended drawings in which:—

Fig. 1 is an elevational view showing the measuring and issuing container, parts being broken away;

Fig. 2 is a cross-sectional view taken on line II—II of Fig. 1;

Fig. 3 is a partly elevational and cross-sectional view of the issuing container and its feeding tank as a whole, drawn on a reduced scale;

Figs. 4 and 5 are a top and a bottom plan view respectively of the packing member interposed between the stationary and the movable bottoms of the measuring container;

Figs. 6 and 7 are half cross-sectional views of the said packing member taken on lines VI—VI and VII—VII of Fig. 4 respectively;

Figs. 8—9, 10—11 and 12—13 are diagrammatic views showing the apparatus in each of its three operating positions respectively;

Figs. 8, 10 and 12 being diagrammatic vertical cross sections of the measuring container while Figs. 9, 11 and 13 are plan views of the bottom thereof.

The apparatus comprises a glass measuring container 1 provided at the upper portion thereof with an orifice the edges of which carry a threaded plug 5 receiving a cap 8; the edges of the plug and cap are pressed on those of the measuring container orifice with the interposition of packing rings 12, 13.

The bottom of the cap 8 carries a rubber seat 9 and holes 6, 7, 10, 11 are provided in the said seat, plug and cap to provide a passage for the air.

The seat 9 cooperates with the valve spindle 4 which is actuated through suitably arranged pivoting levers 3 by a float 2 received in the container 1, the whole being suitably arranged in order that at the completion of the filling the spindle may bear on the seat and cut off the measuring container as the milk reaches an accurately defined level flush with a mark-line 0 scratched on the glass.

The orifices 6, 7, 10, 11 will allow the air to pass during filling and delivery.

The base of the container 1 is provided with a pivoting bottom 14 and the said members are connected to each other by means of a clamping ring 15 secured to the bottom 14 by means of drop spring fasteners 17 which press it upon the bottom flange 1a of the container; a rubber packing ring 16 is clamped between the ring 15, the flange 1a and the bottom 14 and provides for a perfect liquid-tightness while allowing the bottom 14 to pivot with respect to the container.

The said movable bottom is pressed against the stationary bottom 23 with the interposition of a rubber packing member 21 which is held from pivoting with respect to the bottom 23 by the engagement of bosses 22 on its lower face into recesses in the said bottom.

The assembly and centering of the movable bottom 14, the packing member 21 and the stationary bottom 23 are obtained by means of a boss 24 formed on the underside of the movable bottom; the said boss projects through a central hole 21a in the packing member into a recess 23a in the stationary bottom.

A stud 27 is secured in the boss 24 and a spring 26 pressed between a nut 25 screwed on the said stud and the bottom of the recess 23a provides for the necessary tightening.

The cross-sectional outline of the packing member 21 (see Figs. 6 and 7) is such that an absolute fluid-tightness of the joint will be ensured even after a very long use, the spring 26 providing for the taking up of the wear of the rubbing parts and making for a very easy operation of the movable bottom 14.

Such operation is effected by means of a handle 20 solid with the movable bottom.

By operating the said handle the movable bottom can be set in three positions defined by an index line N scratched on the edge of the bottom 23 and cooperating with three other index lines scratched on the edge of the movable bottom and marked "R" (filling), "½ L" (issue of ½ litre) and "1 L" (issue of 1 litre), respectively.

Moreover, these three positions are defined by means of suitably arranged stops which do away with any fumbling and all risks of error.

The movable bottom 14 carries a vertical conduit 18 the upper orifice of which is positioned at such height that when the milk reaches its level it will fill out exactly one half of the capacity of container 1.

The setting of such capacity can be effected with all the desired accuracy by means of a bloc 19 of suitable volume which is passed over the said tube 18 and which is secured thereto by means of a screw 37 which may be sealed to avoid any possibility of fraud.

The measuring container 1 is fed by gravity from a tank to which it can be connected as desired through a union 29 secured to the underside of the bottom 23 by means of hinged bolts 28 allowing said union to be fitted and taken away instantaneously.

Provided in the bottom 23 and the packing member 21 in line with the orifice of the said union is a filling conduit $r$ with which a port $r'$ in the movable bottom 14 is adapted to cooperate.

The milk is delivered through a conduit 30 leading through the stationary bottom 23 and opening under a hole $v$ in the packing member 21.

The said hole opens at the end of a groove $v''$ in the form of an arc of circle which is formed in the upper face of the packing member and which terminates at its other end in a recess $v'$.

Producing the conduit 18 at right angles is a radially directed portion 18' which leads to a port $t$ in the bottom 14.

Finally, a third port $t_1$ is formed in the said bottom and the angular distance between the two holes $t$, $t_1$ is equal to the aperture of the arc $v''$.

The operation is as follows:—

In the filling position diagrammatically shown in Figs. 8 and 9 the movable bottom occupies such a position that the filling port $r'$ will be in line with the filling port $r$.

In this position the port $v$ and the whole groove $v''$ will be positioned below the solid portions of the movable bottom.

The milk flowing from the tank 31 through the union 29 fills the container until it reaches the mark line 0, when the spindle 4 will close the air outlet by bearing on the seat 9.

In order to issue half a litre of milk the bottom 14 is caused to rotate by 60° in the direction of the arrow F.

At the completion of such pivotal movement (Figs. 10, 11) the port $r$ will be positioned below a solid portion of the bottom 14, while port $t$ will be in line with port $v$.

In this position the milk in 1 will flow through 18, 18', $t$, $v$ and 30 until its level has reached that of the orifice 18, when the outflow will stop and, as mentioned above, half a litre of liquid has been issued.

After the container 1 has been refilled and if one litre is to be issued at one time, the bottom 14 is caused to rotate by 120° in the direction of the arrow F, starting from the position shown in Figs. 8 and 9.

When such pivotal movement is completed (Figs. 12, 13) the port $r$ is still below a solid portion of the movable bottom, while port $t$ is above the recess $v'$ and port $t_1$ above port $v$.

In this position the milk will flow into the conduit 30 on one hand directly through $t_1$, $v$ and on the other hand through 18, 18', $t$, $v'$, $v''$, $v$ so that the container 1 will empty completely and one litre of liquid will thus be issued.

As the container 1 is made of glass it is an easy matter to watch the above operations and to control the exactness of the deliveries with the aid of the marks scratched on the glass.

It is to be noted moreover that the design of the apparatus precludes any faulty operation; in particular it avoids any direct connection between inlet 29 and outlet 30 and thereby any loss of milk.

In addition, the apparatus has the advantage that it can be taken to pieces and cleaned throughout easily and rapidly inasmuch as for effecting this operation it is only necessary to pull the fasteners 17 and the bolts 28 out of their clamping positions and to screw away the nut 27 and the cap 8.

Cleaning is made even easier on account of the apparatus comprising few parts of simple shapes and high strength.

Such taking down and cleaning operations, even when performed most repeatedly in order that the apparatus may remain perfectly clean, will not impair its accuracy in any way.

Finally, any fraud is made impossible by reason of the marks scratched on the container 1, of the shape given to the packing members 16 and 13 and to their attaching members and of the fact that a foreign body cannot be introduced into the container 1 as same would then be visible through the walls of the latter.

The apparatus is normally fed by gravity from an isothermic tank having all its parts 31 in contact with the air made preferably of sheet steel while all its parts 32 in contact with the milk are made of pure aluminium.

The free space between these two series of parts is filled up with a suitable heat-insulating material 33 such as cork, silk or the like.

Moreover, the cover of the said tank is provided with an agitator member 33 rigid with an operating handle 36 which allows the milk to be stirred in order to homogenize the same perfectly at the time of its delivery.

As the milk in such a tank is removed from any soiling cause and is maintained at uniform and comparatively low temperature it will keep in the best conditions.

The tank of pure aluminium is so shaped that it can be cleaned easily and thoroughly.

Finally, a last advantage of the plant is that it does away with any manipulation of the liquid for the issue, as the passage into the measuring container, then into the delivery conduit takes place in a wholly automatic manner.

It is to be understood that the invention is not limited to the embodiment described above by way of example only and that the details of construction and particularly the shape, arrangement and assembly of the constant level device at the top of the measuring container, of parts 18 and 21, of the movable distribution valve, etc., may be modified in all suitable manners without thereby departing from its scope; in particular, a plurality of such devices as 18—18'—$v''$ may be provided and the whole may be suitably arranged to allow issuing the whole amount of liquid in the container 1 or several different fractions thereof as desired; the delivery ports also may be arranged so that for a 1-litre issue the milk shall not flow out through 18, the capacity of the container 1 then being suitably calculated with this end in view.

I claim:

1. In a measuring and issuing apparatus for all kinds of liquids, the combination of a measuring container having air passage apertures provided at the upper portion thereof, a movable bottom at the lower portion of the said container and a stationary bottom below the said movable bottom, said movable bottom being liquid-tightly connected to the said container and a disc-like packing member being fluid-tightly interposed between either bottom and comprizing filling and delivery apertures.

2. In a measuring and issuing apparatus for all kinds of liquids, the combination of a measuring container having air passage apertures provided at the upper portion thereof, a movable bottom at the lower portion of the said container and a stationary bottom below the said movable bottom, said movable bottom being connected to the said container by means of a clamping ring pressed thereon by drop spring fasteners hinged to the movable bottom.

FRANÇOIS FOUGA.